US012752873B2

(12) United States Patent
Chen

(10) Patent No.: US 12,752,873 B2
(45) Date of Patent: Oct. 6, 2026

(54) ADJUSTABLE CONNECTOR FOR CONNECTING A MUDGUARD TO A BICYCLE

(71) Applicant: Jalco Industry Co., Ltd., Huatan Township (TW)

(72) Inventor: Han-Tsung Chen, Huatan Township (TW)

(73) Assignee: Jalco Industry Co., Ltd., Huatan Township (TW)

( * ) Notice: Subject to any disclaimer, the term of this patent is extended or adjusted under 35 U.S.C. 154(b) by 246 days.

(21) Appl. No.: 18/823,098

(22) Filed: Sep. 3, 2024

(65) Prior Publication Data

US 2026/0062084 A1 Mar. 5, 2026

(51) Int. Cl.

| | |
|---|---|
| ***B62J 15/02*** | (2006.01) |
| ***B62J 15/00*** | (2006.01) |
| *B62J 7/04* | (2006.01) |
| *B62J 17/083* | (2020.01) |
| *B62J 23/00* | (2006.01) |

(52) U.S. Cl.
CPC ............... *B62J 15/02* (2013.01); *B62J 15/00* (2013.01); *B62J 7/04* (2013.01); *B62J 17/083* (2020.02); *B62J 23/00* (2013.01)

(58) Field of Classification Search
CPC . B62J 15/02; B62J 15/00; B62J 17/083; B62J 23/00; B62J 7/04
See application file for complete search history.

(56) References Cited

U.S. PATENT DOCUMENTS

| | | | | |
|---|---|---|---|---|
| 6,554,307 | B1 * | 4/2003 | Ockenden | B62K 27/003 280/204 |
| 7,273,221 | B2 * | 9/2007 | Ockenden | B62K 19/40 280/288.4 |
| 7,976,041 | B2 * | 7/2011 | Chuang | B62J 15/02 280/848 |
| 2017/0021885 | A1 * | 1/2017 | Montague | B62H 1/04 |
| 2025/0206402 | A1 * | 6/2025 | Chen | B62J 15/02 |
| 2026/0145755 | A1 * | 5/2026 | Robinson | B62J 7/04 |

FOREIGN PATENT DOCUMENTS

| | | | | |
|---|---|---|---|---|
| DE | 20306363 U1 * | 6/2003 | | B62J 15/02 |
| EP | 3984869 A1 * | 4/2022 | | B62J 15/02 |
| GB | 2342080 A * | 4/2000 | | B62J 7/04 |

* cited by examiner

*Primary Examiner* — Kevin Hurley
*Assistant Examiner* — Marlon A Arce
(74) *Attorney, Agent, or Firm* — Wang Law Firm, Inc.

(57) ABSTRACT

An adjustable connector includes a support unit and a connection unit. The support unit includes a strut and an adjusting element. The strut includes an upper section attached to a mudguard and a lower section made with a longitudinal screw hole. The adjusting element includes a threaded section movably inserted in the longitudinal screw hole. The connection unit includes a socket, a fastener and a screw. The socket includes a longitudinal bore, a transverse aperture and a transverse screw hole. The longitudinal bore receives the adjusting element and the lower section of the strut. The fastener is inserted in a bicycle frame through the transverse aperture. The screw is abutted against the lower section of the strut through the transverse screw hole.

5 Claims, 7 Drawing Sheets

ADJUSTABLE CONNECTOR FOR CONNECTING A MUDGUARD TO A BICYCLE

FIELD OF INVENTION

The present invention relates to a bicycle and, more particularly, to an adjustable connector for connecting a mudguard to a bicycle.

RELATED PRIOR ART

A bicycle is sometimes equipped with a mudguard to keep a rider from mud spattered by a wheel of the bicycle. A connector is used to connect the mudguard to a frame of the bicycle. On one hand, the mudguard should be adequately near the wheel to effectively guard mud. On the other hand, the mudguard should be sufficiently far from the wheel to avoid contacting the wheel. However, it is difficult to keep the mudguard at a proper distance from the wheel since the length of the connector is constant while the frame of the bicycle and the wheel can be made of various sizes. To overcome this problem, connectors are made in various sizes, and this is not desirable.

The present invention is therefore intended to obviate or at least alleviate the problems encountered in the prior art.

SUMMARY OF INVENTION

It is the primary objective of the present invention to provide an adjustable connector for connecting a mudguard to a bicycle frame.

To achieve the foregoing objective, the adjustable connector includes a support unit and a connection unit. The support unit includes a strut and an adjusting element. The strut includes an upper section attached to the mudguard and a lower section made with a longitudinal screw hole. The adjusting element includes a threaded section movably inserted in the longitudinal screw hole. The connection unit includes a socket, a fastener and a screw. The socket includes a longitudinal bore, a transverse aperture and a transverse screw hole. The longitudinal bore receives the adjusting element and the lower section of the strut. The fastener is inserted in the bicycle frame through the transverse aperture. The screw is abutted against the lower section of the strut through the transverse screw hole.

Other objectives, advantages and features of the present invention will be apparent from the following description referring to the attached drawings.

BRIEF DESCRIPTION OF DRAWINGS

The present invention will be described through detailed illustration of the preferred embodiment referring to the drawings wherein.

DETAILED DESCRIPTION OF PREFERRED EMBODIMENT

Figure 1:
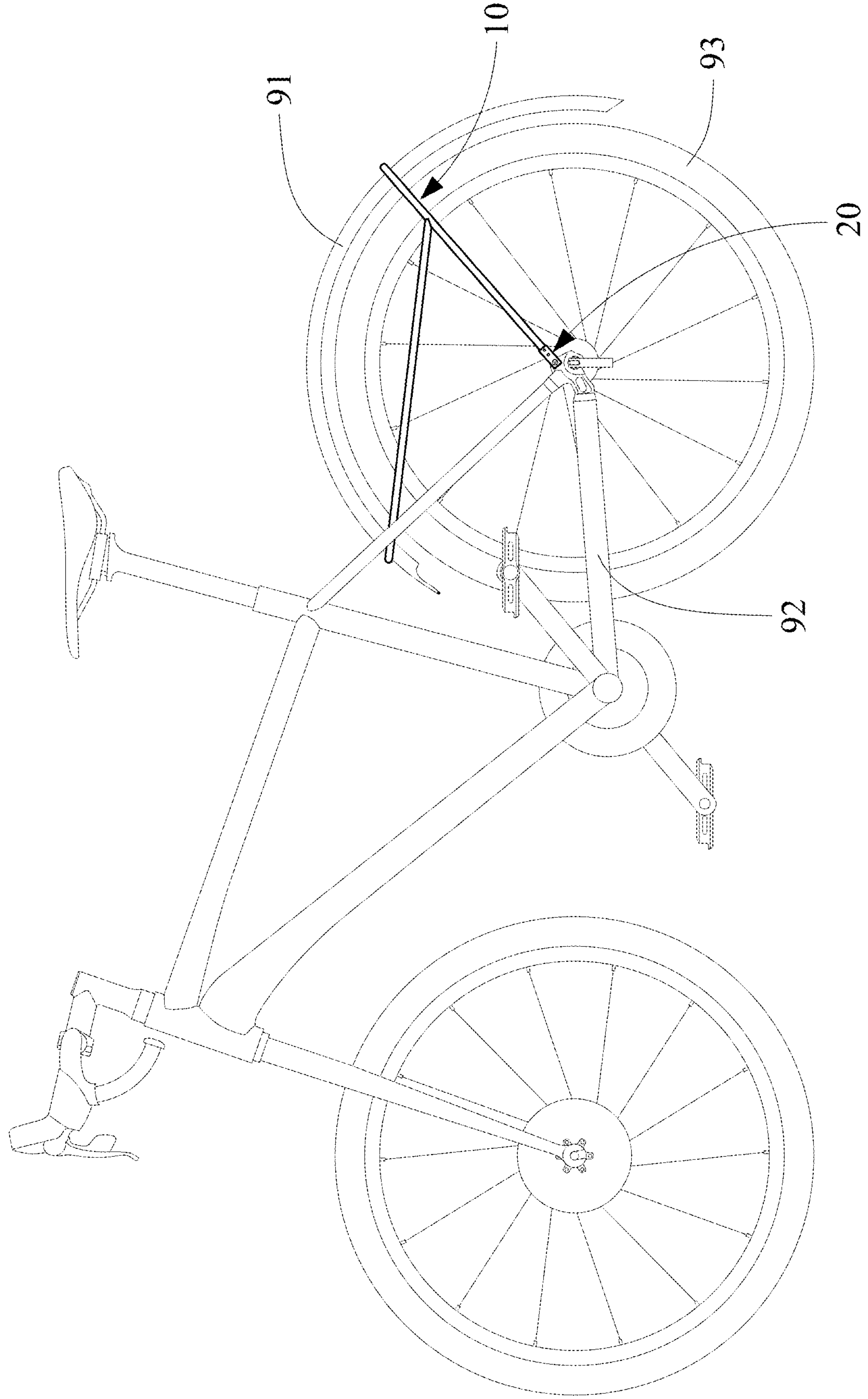
FIG. 1 is a side view of an adjustable connector for connecting a mudguard to a bicycle according to the preferred embodiment of the present invention.
Figure 2:
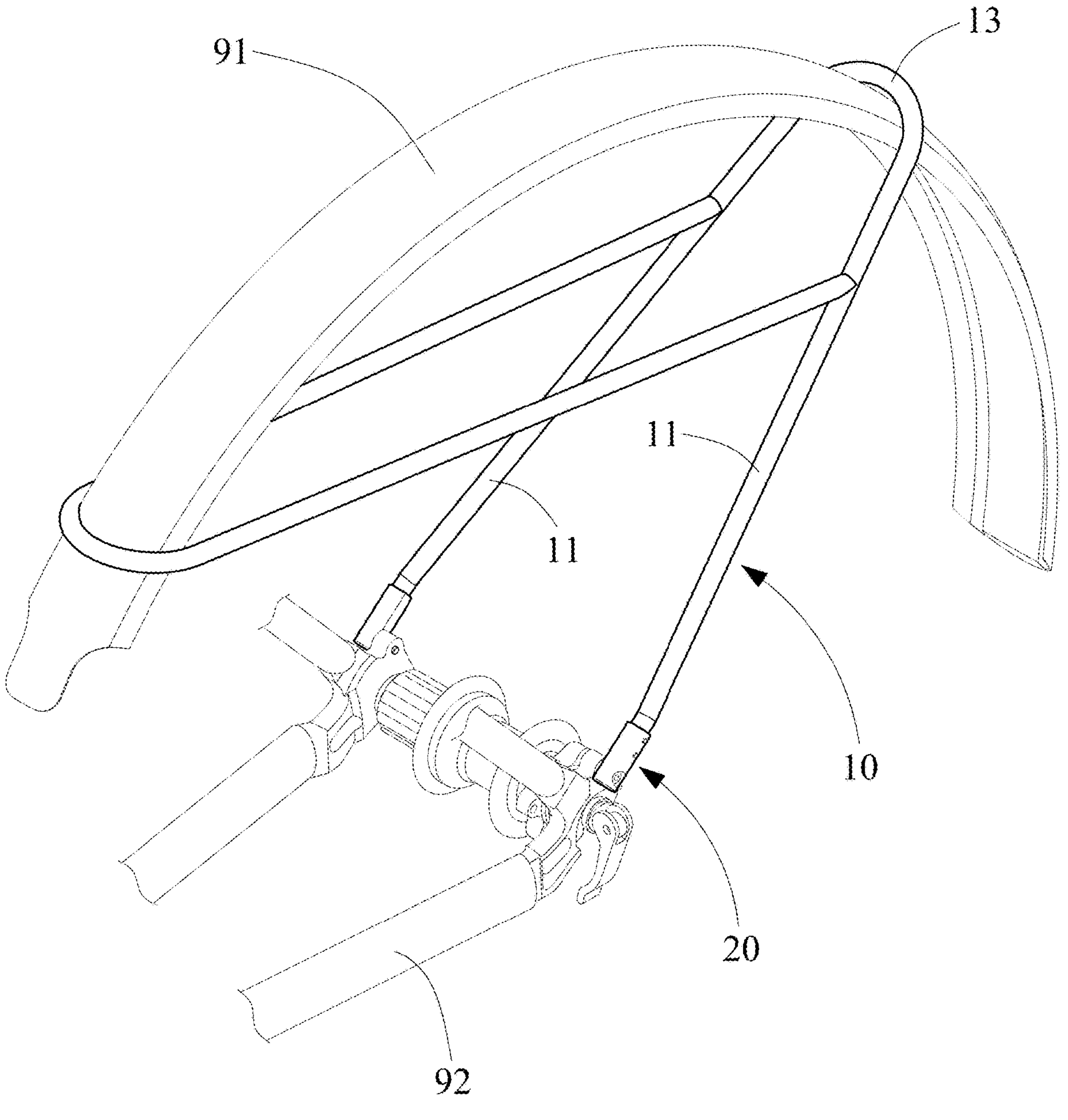
FIG. 2 is a perspective view of the adjustable connector depicted in FIG. 1.
Figure 3:
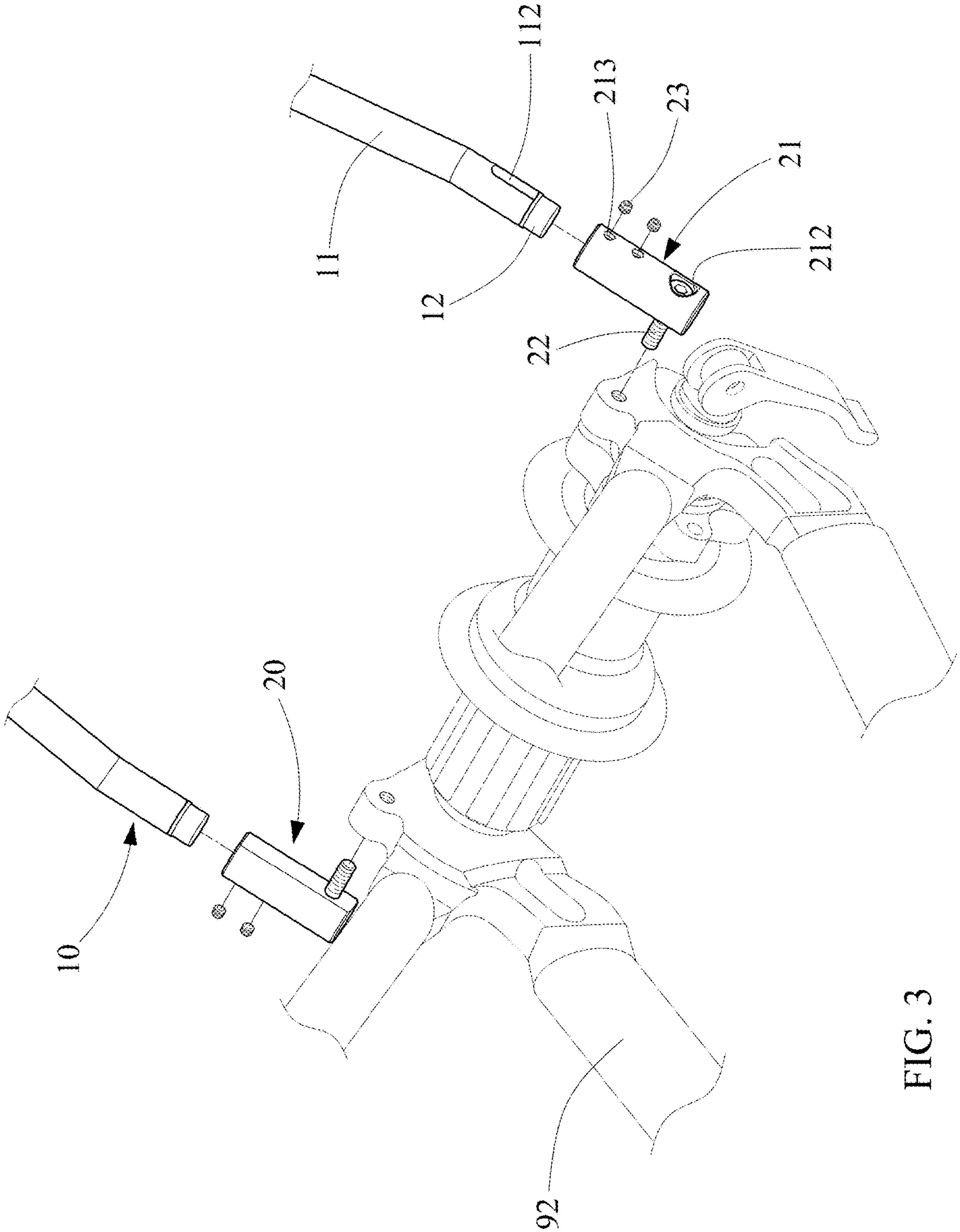
FIG. 3 is an enlarged partial view of the adjustable connector depicted in FIG. 2.
Figure 4:
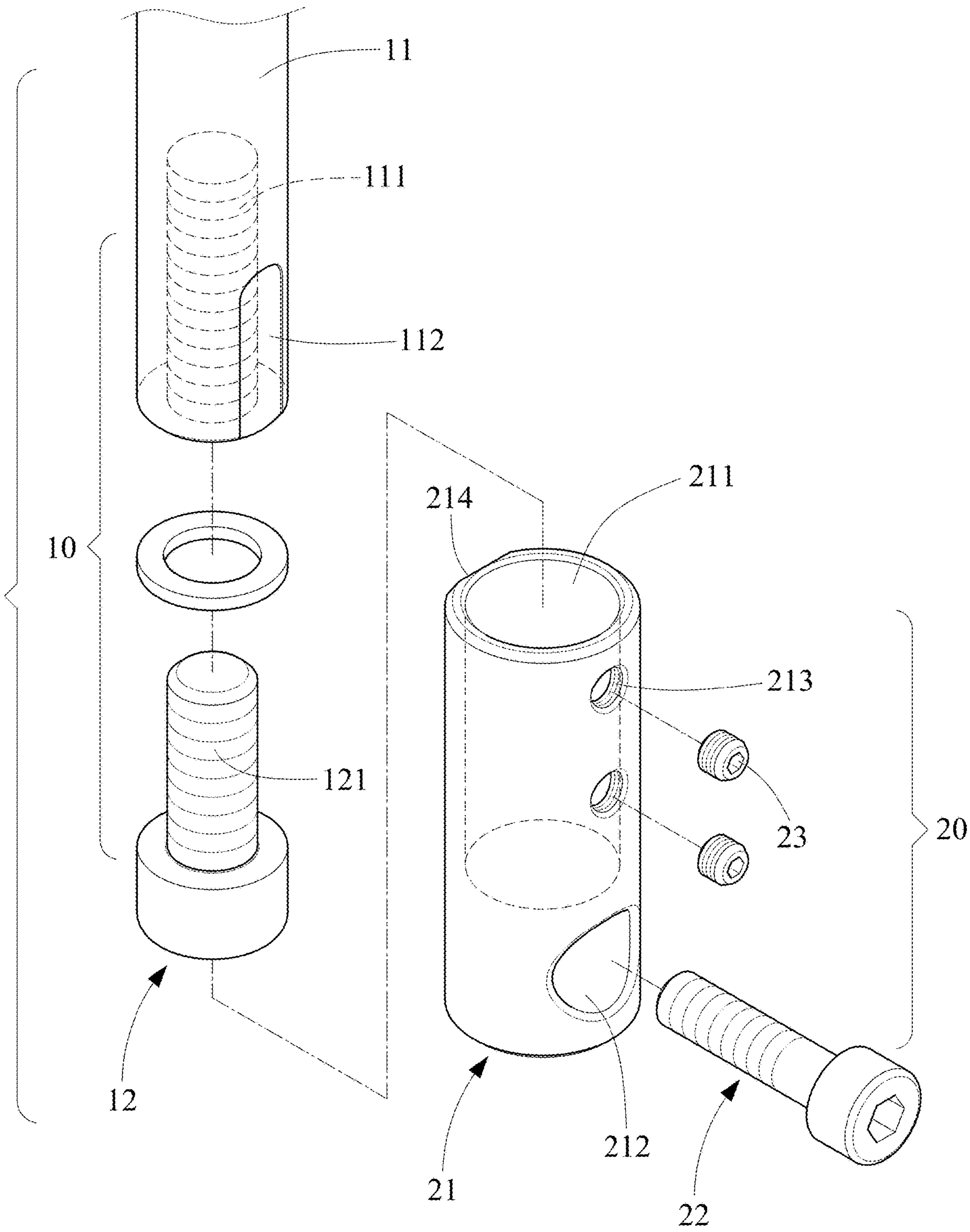
FIG. 4 is an enlarged partial and exploded view of the adjustable connector depicted in FIG. 3.

Referring to FIGS. 1 through 5, a mudguard 91 is connected to a bicycle frame 92 by an adjustor connector according to the preferred embodiment of the present invention. The adjustable connector includes a support unit 10 and at least one such as two connection units 20.

The support unit 10 includes at least one such as two struts 11 and at least one such as two adjusting elements 12. The support unit 10 further includes an arched bar 13 extending between the struts 11 so that the support unit 10 is an inverted U-shaped element. The arched bar 13 of the support unit 10 is connected to the mudguard 91.

Each of the struts 11 includes a screw hole 111 axially made in a lower section and a planar facet 112 formed on a side.

Each of the adjusting elements 12 includes a threaded section 121 inserted in the screw hole 111 of one of the struts 11. Thus, the adjusting elements 12 are connected to the struts 11.

Each of the connection units 20 includes a socket 21, a fastener 22 and at least one such as two screws 23.

The socket 21 includes longitudinal bore 211, a transverse aperture 212, two screw holes 213 and planar facet 214.

The longitudinal bore 211 receives one of the adjusting elements 12 and the lower section of one of the struts 11.

The transverse aperture 212 is a countersink hole corresponding to the fastener 22.

The screw holes 213 transversely extend in the socket 21.

The planar facet 214 extends on a side of the socket 21. The planar facet 214 is devised for contact with a planar portion of the bicycle frame 92.

The fastener 22 is preferably a threaded bolt. In use, the fastener 22 extends into a screw hole (not numbered) made in the bicycle frame 92 throughout the transverse aperture 212. Thus, the socket 21 is connected to the bicycle frame 92.

In use, each of the screws 23 extends throughout one of the screw holes 213. The tip of each of the screws 23 abuts against the planar facet 112 of one of the struts 11.

The use of the adjustable connector to connect the mudguard 91 to the bicycle frame 92 will be described below.

Figure 5:
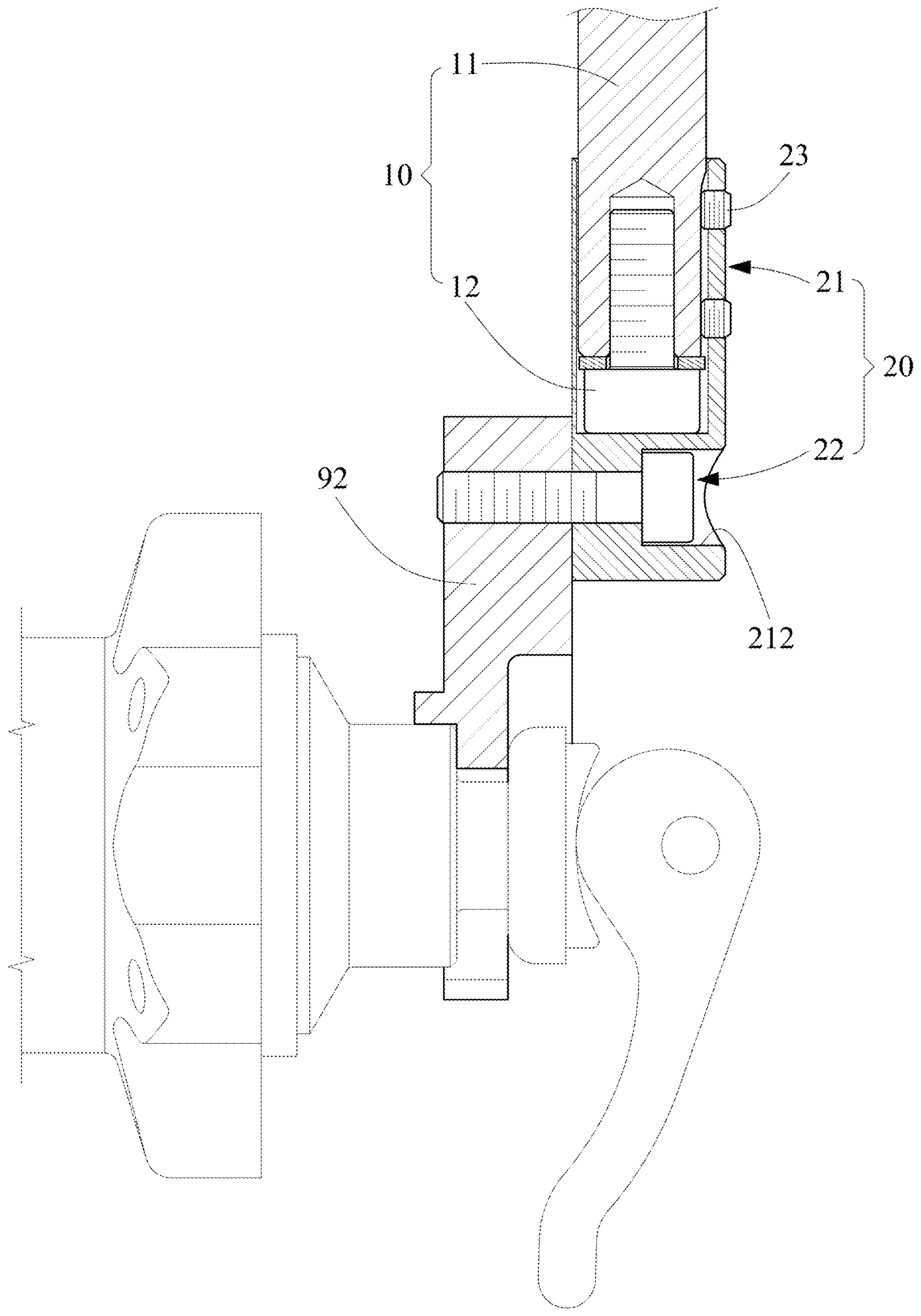
FIG. 5 is an enlarged partial and cross-sectional view of the adjustable connector shown in FIG. 2.
Figure 6:
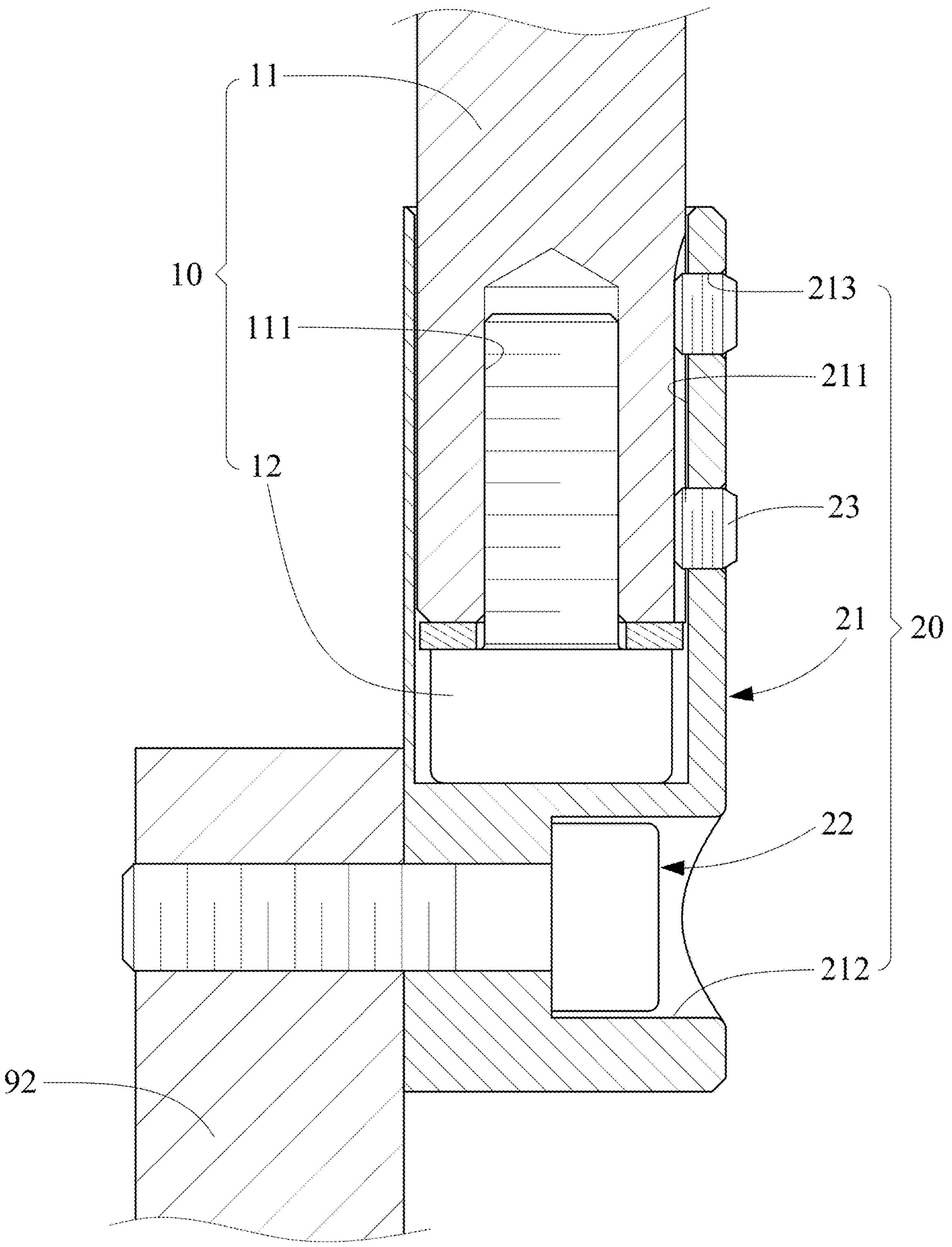
FIG. 6 is an enlarged partial and cross-sectional view of the adjustable connector shown in FIG. 5.
Figure 7:
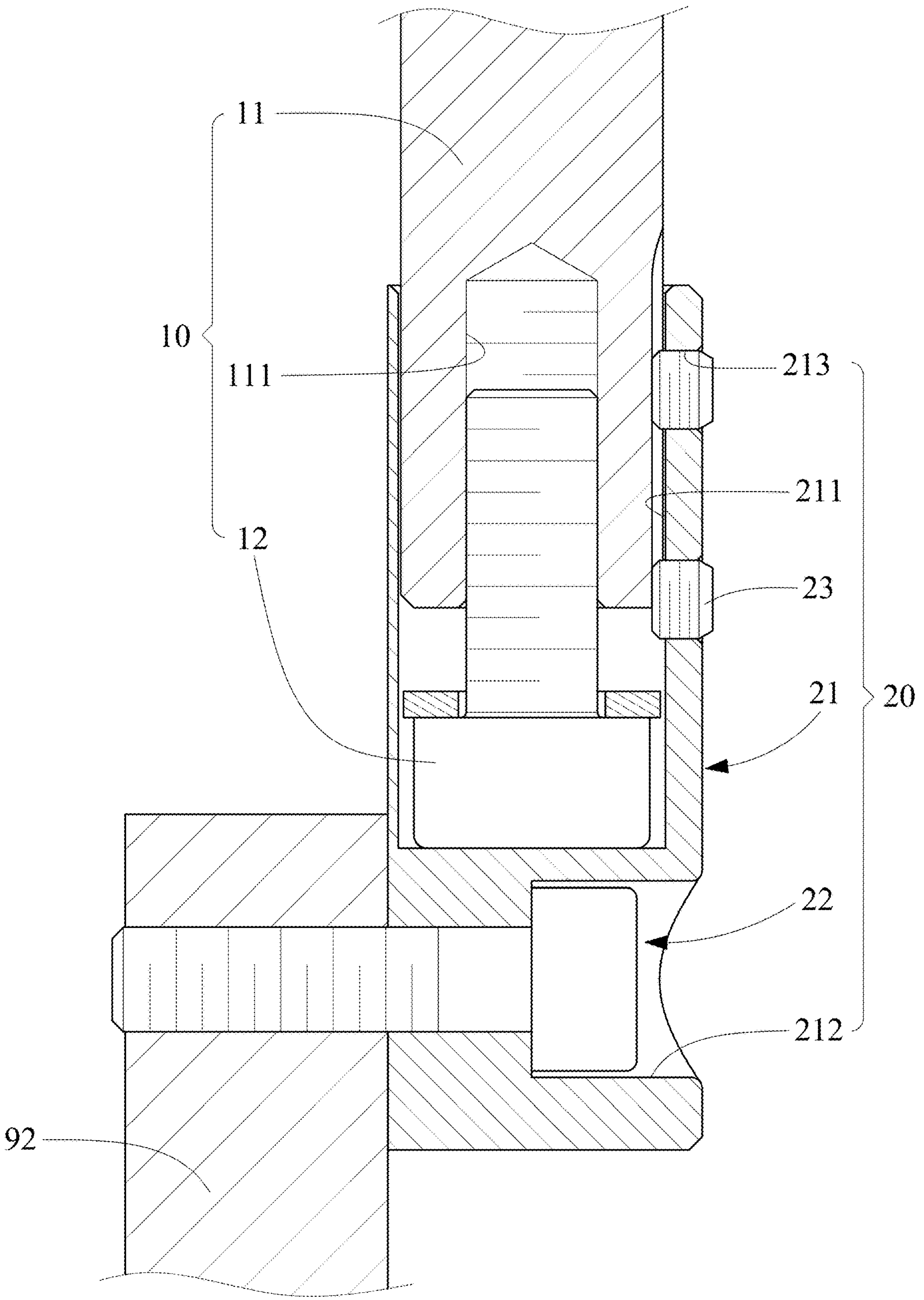
FIG. 7 is an enlarged partial and cross-sectional view of the adjustable connector in another position than shown in FIG. 6.

Referring to FIGS. 5 through 7, the socket 21 is connected to the bicycle frame 92 by inserting the fastener 22 in the screw hole made in the bicycle frame 92 through the transverse aperture 212. The threaded section 121 of each of the adjusting elements 12 is inserted in the screw hole 111 of one of the struts 11 before each of the adjust elements 12 and the lower section of each of the struts 11 are inserted in the longitudinal bore 211 of one of the sockets 21. A head (not numbered) of each of the fasteners 12 is in contact with a closed end (not numbered) of the longitudinal bore 211 of each of the sockets 21. The screws 23 of each of the connection units 20 are abutted against the planar facet 112 of one of the struts 11 through the screw holes 213 made in one of the sockets 21.

An upper section of each of the struts 11 is connected to the mudguard 91 and the lower section of each of the struts 11 is abutted against the closed end of the longitudinal bore 211 of one of the sockets 21. Furthermore, the struts 11 are kept in position relative to the sockets 21 through the screws 23. Thus, the mudguard 91 is kept in position relative the wheel 93.

The adjusting elements 12 are movable toward or from the struts 11 by rotating the adjusting elements 12 relative to the struts 11. That is, a length of the combination of each of the adjusting elements 12 with one of the struts 11 is reduced or increased. Accordingly, the mudguard 91 is movable toward or from the wheel 93. Hence, the adjustable connector is useful for connecting the mudguard 91 to various combinations of a wheel with a bicycle so that the mudguard 91 is at a proper distance from the wheel.

The present invention has been described through the illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. An adjustable connector comprising:

a support unit (10) comprising:

at least one strut (11) comprising an upper section attached to a mudguard (91) and a lower section made with a longitudinal screw hole (111);

at least one adjusting element (12) comprising a threaded section (121) movably inserted in the longitudinal screw hole (111); and at least one connection unit (20) comprising:

a socket (21) comprising a longitudinal bore (211) for receiving the adjusting element (12) and the lower section of the strut (11), a transverse aperture (212), and a transverse screw hole (213);

a fastener (22) inserted in a bicycle frame (92) through the transverse aperture (212); and a screw (23) abutted against the lower section of the strut (11) through the transverse screw hole (213).

2. The adjustable mudguard-supporting apparatus according to claim 1, wherein the socket (21) comprises a planar facet (214) in contact with a planar facet of the bicycle frame (92).

3. The adjustable mudguard-supporting apparatus according to claim 1, wherein the lower section of the strut (11) comprises a planar facet (112) in contact with a tip of the screw (23).

4. An adjustable connector comprising:

a support unit (10) comprising:

two struts (11) each of which comprises an upper section attached to a mudguard (91) and a lower section made with a longitudinal screw hole (111);

two adjusting elements (12) each of which comprises a threaded section (121) movably inserted in the longitudinal screw hole (111) of one of the struts (11); and two connection units (20) each of which comprises:

a socket (21) comprising a longitudinal bore (211) for receiving one of the adjusting elements (12) and the lower section of one of the struts (11), a transverse aperture (212), and a transverse screw hole (213);

a fastener (22) inserted in a bicycle frame (92) through the transverse aperture (212); and a screw (23) abutted against the lower section of one of the struts (11) through the transverse screw hole (213).

5. The adjustable connector according to claim 1, wherein the support unit comprises an arched bar (13) formed between the struts (11), wherein the arched bar (13) is connected to the mudguard (91).

* * * * *